(12) United States Patent
Jiang et al.

(10) Patent No.: US 11,927,779 B2
(45) Date of Patent: Mar. 12, 2024

(54) METHOD FOR MANUFACTURING RETROREFLECTIVE SHEET AND RETROREFLECTIVE SHEET

(71) Applicant: NIPPON CARBIDE INDUSTRIES CO., INC., Tokyo (JP)

(72) Inventors: Chenyang Jiang, Toyama (JP); Toshiaki Shiomi, Toyama (JP)

(73) Assignee: NIPPON CARBIDE INDUSTRIES CO., INC., Tokyo (JP)

( * ) Notice: Subject to any disclaimer, the term of this patent is extended or adjusted under 35 U.S.C. 154(b) by 860 days.

(21) Appl. No.: 16/978,222

(22) PCT Filed: Mar. 26, 2019

(86) PCT No.: PCT/JP2019/012815
§ 371 (c)(1),
(2) Date: Sep. 4, 2020

(87) PCT Pub. No.: WO2019/189154
PCT Pub. Date: Oct. 3, 2019

(65) Prior Publication Data
US 2021/0003751 A1 Jan. 7, 2021

(30) Foreign Application Priority Data

Mar. 27, 2018 (JP) .................. 2018-060515

(51) Int. Cl.
*G02B 5/122* (2006.01)
*B32B 27/08* (2006.01)
*G02B 5/124* (2006.01)

(52) U.S. Cl.
CPC .............. *G02B 5/124* (2013.01); *B32B 27/08* (2013.01)

(58) Field of Classification Search
CPC .................. G02B 5/124; B32B 27/08
See application file for complete search history.

(56) References Cited

U.S. PATENT DOCUMENTS

| 5,882,796 A | 3/1999 | Wilson et al. |
| 6,911,486 B2 | 6/2005 | Mimura |

(Continued)

FOREIGN PATENT DOCUMENTS

| CN | 1215477 A | 4/1999 |
| CN | 1366619 A | 8/2002 |

(Continued)

OTHER PUBLICATIONS

Panasonic Corporation, Panasonic Commercializes "Time-lagged UV Curing Adhesive" Suitable for Assembly of Mobile Phone Housings and UV-Protection Panels, http://news.panasonic.com/global/press/en160825-6, Jun. 20, 2023, pp. 1-5.

*Primary Examiner* — Euncha P Cherry
(74) *Attorney, Agent, or Firm* — VENABLE LLP

(57) ABSTRACT

A method for manufacturing a retroreflective sheet, provided with a retroreflective layer having retroreflective elements on one surface, a back face layer provided to face the retroreflective elements, a coupling portion to couple a part of the retroreflective elements and a part of the back face layer, the method including a preparation step of preparing a resin composition that has a viscosity capable of adhering over a predetermined time after application of predetermined energy, and completes curing after the predetermined time passes, a coating step of applying the resin composition forming the coupling portion on the retroreflective layer or the back face layer, an energy application step of applying the predetermined energy to the resin composition, and a bonding step of bonding the retroreflective layer and the back face layer via the resin composition to which the predetermined energy is applied before the predetermined time passes.

16 Claims, 3 Drawing Sheets

(56) References Cited

U.S. PATENT DOCUMENTS

| | | |
|---|---|---|
| 2014/0078586 A1 | 3/2014 | Spurgeon |
| 2016/0011346 A1 | 1/2016 | Vasylyev |
| 2016/0370514 A1 | 12/2016 | Pavelka |
| 2017/0357039 A1* | 12/2017 | Ueda ........................ B60R 13/10 |

FOREIGN PATENT DOCUMENTS

| | | |
|---|---|---|
| EP | 1 193 511 A1 | 4/2002 |
| GB | 2 254 826 A | 10/1992 |
| JP | 2000-508088 | 6/2004 |
| JP | 2004-177764 | 6/2004 |
| WO | 2016/100733 A1 | 6/2016 |
| WO | 2018/051868 | 3/2018 |

\* cited by examiner

METHOD FOR MANUFACTURING RETROREFLECTIVE SHEET AND RETROREFLECTIVE SHEET

This application is a national stage of PCT application No. PCT/JP2019/012815 filed Mar. 26, 2019, which in turn claims priority of Japanese Patent Application No. 2018-060515 filed Mar. 27, 2018, the contents of which are incorporated herein by reference.

TECHNICAL FIELD

The present invention relates to a method for manufacturing a retroreflective sheet, and a retroreflective sheet.

BACKGROUND ART

A retroreflective sheet has the property of being able to reflect incident light to a light source side. Since the retroreflective sheet has such a property, it is used for the purpose of making it easier to see an object such as a printed matter when light is emitted at night or in the dark. The retroreflective sheet is used for, for example, a traffic sign, a guide sign, a vehicle number plate, an advertisement sign, a traffic lane marker, a delineator, and the like.

As such a retroreflective sheet, for example, Patent Literature 1 described below discloses a retroreflective sheet including a retroreflective layer having a plurality of retroreflective elements on one surface, a back face layer composed of a thermoplastic sealing film provided so as to face the retroreflective elements, and a binder provided between the retroreflective layer and the back face layer. In this retroreflective sheet, a part of the retroreflective layer and a part of the back face layer are coupled by a binder, and gaps are formed between the other part of the retroreflective elements and the other part of the back face layer. Light incident on the retroreflective layer from the surface of such a retroreflective sheet is retroreflected at the interface between the retroreflective elements and the gaps. An observer visually recognizes the light retroreflected at the interface between the retroreflective elements and the gaps in this way.

[Patent Literature 1] JP 2000-508088 A

SUMMARY OF INVENTION

The binder described in Patent Literature 1 contains a radiation curable component, and by irradiating the binder and curing it after the retroreflective layer and the back face layer are laminated, the retroreflective layer and the back face layer are bonded by the binder. In order to cure the binder after the retroreflective layer and the back face layer are laminated in this way, the retroreflective layer or the back face layer needs to sufficiently transmit radiation such as ultraviolet rays. Therefore, in the case of adding an ultraviolet absorber to the retroreflective layer for the purpose of suppressing the deterioration of the retroreflective sheet or coloring the back face layer from the viewpoint of improving the designability, the retroreflective layer and the back face layer may be less transparent to radiation, and the binder may be insufficiently cured. That is, in the retroreflective sheet described in Patent Literature 1, the material forming the retroreflective layer or the back face layer is limited to a material that sufficiently transmits radiation such as ultraviolet rays.

Therefore, it is an object of the present invention to provide a method for manufacturing a retroreflective sheet and a retroreflective sheet, capable of expanding selection range of constituent materials of a retroreflective layer and a back face layer.

A method for manufacturing a retroreflective sheet according to the present invention, for solving the above-described problem, is provided with a retroreflective layer having a plurality of retroreflective elements on one surface, a back face layer provided to face a plurality of the retroreflective elements, a coupling portion to couple a part of a plurality of the retroreflective elements and a part of the back face layer. The method includes a preparation step of preparing a resin composition that has a viscosity capable of adhering over a predetermined time after application of predetermined energy, and completes curing after the predetermined time passes, a coating step of applying the resin composition forming the coupling portion on the retroreflective layer or the back face layer, an energy application step of applying the predetermined energy to the resin composition, and a bonding step of bonding the retroreflective layer and the back face layer via the resin composition to which the predetermined energy is applied before the predetermined time passes.

As described above, the resin composition forming the coupling portion has a viscosity capable of adhering over a predetermined time after predetermined energy is applied, and it is completely cured after the elapse of the predetermined time. In the present description, "curing is completed" means a state in which the viscosity of a resin composition is increased to such an extent that the retroreflective layer and the back face layer cannot be bonded to each other via the resin composition.

Therefore, the curing of the resin composition can be completed after the retroreflective layer and the back face layer are bonded together via the resin composition by applying predetermined energy to the resin composition before the retroreflective layer and the back face layer are bonded together via the resin composition. Therefore, the retroreflective layer and the back face layer do not need to transmit radiation such as ultraviolet rays, which is an energy source, for curing the resin composition forming the coupling portion. Therefore, the retroreflective layer and the back face layer may be made of a material that does not transmit radiation such as ultraviolet rays. Further, when the resin composition forming the coupling portion is cured after being heated as predetermined energy, the curing of the resin composition can be completed after the retroreflective layer and the back face layer are bonded together via the resin composition by applying heat to the resin composition before the retroreflective layer and the back face layer are bonded together via the resin composition. Therefore, heat for curing the resin composition forming the coupling portion can be added to the resin composition without passing through the retroreflective layer and the back face layer. Thus, the retroreflective layer and the back face layer may be made of a flexible material that can be deformed by heat. As described above, in the method for manufacturing retroreflective sheet of the present invention, the range of selection of constituent materials of the retroreflective layer and the back face layer can be expanded.

Further, the bonding step is preferably performed before the curing of the resin composition starts.

By laminating the retroreflective layer and the back face layer via the resin composition before the curing of the resin composition starts, the resin composition may easily adhere to the retroreflective layer and the back face layer.

Further, the bonding step may be performed before the viscosity of the resin composition is increased by 30% or more based on the viscosity of the resin composition when the predetermined energy is applied.

By performing the bonding step before the viscosity of the resin composition increases in this way, the retroreflective layer and the back face layer can be bonded more effectively.

Further, it is preferable that the resin composition be an ultraviolet curable resin, and the resin composition be irradiated with ultraviolet rays in the energy application step.

Since the resin composition is an ultraviolet curable resin, the resin composition can be cured without applying heat, such that deformation of the retroreflective layer and the back face layer due to heat can be suppressed.

Further, it is preferable to further include a curing acceleration step of increasing a curing rate of the resin composition after the bonding step.

By accelerating the curing of the resin composition, the time required for manufacturing of the retroreflective sheet can be shortened.

Further, it is preferable that the resin composition have thixotropy, and in the coating step, the resin composition be applied by screen printing.

Since the resin composition has a thixotropy, the resin composition has flexibility by pressure when it is applied by screen printing. Further, the shape of the resin composition is easily maintained to recover the viscosity of the resin composition after the resin composition has been applied. Further, by applying the resin composition by screen printing, it is possible to easily apply the resin composition thickly.

Further, it is preferable that, in the coating step, the resin composition be applied on the back face layer, and the thickness of the resin composition be ⅔ or more of the height of the retroreflective elements adhered to the resin composition.

By being applied to the back face layer such that the resin composition has a thickness of ⅔ or more of the height of the retroreflective elements adhered to the resin composition, grooves between the retroreflective elements adjacent to each other can be filled with the resin composition when the resin composition is sandwiched between the retroreflective layer and the back face layer and pressed. Therefore, the resin composition can firmly adhere the back face layer and the retroreflective layer.

Further, the predetermined time may be ten seconds or more after the predetermined energy is applied to the resin composition.

In the method for manufacturing the retroreflective sheet as described above, it generally takes about ten seconds or more from applying the predetermined energy to the resin composition until bonding the retroreflective layer and the back face layer together. Therefore, by setting the above predetermined time to ten seconds or more, the retroreflective layer and the back face layer can be effectively bonded together. Note that since the longer the predetermined time is, the longer the time for bonding the retroreflective layer and the back face layer can be ensured, the retroreflective layer and the back face layer can be more effectively bonded together. Therefore, the predetermined time is more preferably, for example, thirty seconds or more, and further preferably one minute or more.

Further, in this case, the predetermined time is preferably two minutes or more after the predetermined energy is applied to the resin composition. In this case, it is possible to secure a longer time for bonding the retroreflective layer and the back face layer, and to more effectively bond the retroreflective layer and the back face layer.

In addition, the method for manufacturing a retroreflective sheet may further include a printed layer forming step of forming a printed layer on a surface of the back face layer facing the retroreflective layer before the coating step.

When the printed layer is formed on the back face layer, light or heat as energy may be blocked by the printed layer and may not be sufficiently transmitted to the resin composition. In this case, the adhesion between the retroreflective layer and the back face layer may be insufficient. However, in this method for manufacturing the retroreflective sheet, as described above, energy such as light and heat can be applied to the resin composition before the retroreflective layer and the back face layer are superimposed on each other, such that a large amount of energy can be applied to the resin composition, as compared with the case where energy is applied after the retroreflective layer and the back face layer are superimposed on each other. Therefore, even if some of the light or heat is blocked by the printed layer, sufficient light and heat can be applied to the resin composition. Therefore, it is possible to effectively adhere the retroreflective layer and the back face layer via the resin composition while forming the printed layer on the back face layer.

Further the retroreflective sheet according to the present invention, for solving the above-described problems, is provided with a retroreflective layer having a plurality of retroreflective elements on one surface, a back face layer provided to face the plurality of retroreflective elements, and a coupling portion to couple a part of a plurality of the retroreflective elements and a part of the back face layers. A gap is provided between another part of a plurality of the retroreflective elements and another part of the back face layer. The coupling portion is made of a resin composition that is in an adhesive state capable of being adhered to the retroreflective layer and the back face layer by applying predetermined energy and in a completely cured state where curing is completed after a predetermined time has passed from the adhesive state.

The coupling portion included in the retroreflective sheet of the present invention is made of a resin composition in which an adhesive state is maintained over a predetermined time after the predetermined energy is applied. Therefore, similarly to the retroreflective sheet manufacturing method of the present invention, the retroreflective sheet of the present invention can expand selection range of constituent materials of the retroreflective layer and the back face layer.

Further, the retroreflective sheet may further include a printed layer formed on a surface of the back face layer that faces the retroreflective layer.

In this way, when the printed layer is formed on the surface of the back face layer that faces the retroreflective layer, under non-retroreflective conditions where light does not retroreflect, light reaches the printed layer and is reflected by the printed layer, and therefore the printed layer can be clearly projected. On the other hand, under the retroreflective conditions where light retroreflects, the light is retroreflected by the retroreflective layer before reaching the printed layer, and therefore the pattern becomes difficult to be displayed. Therefore, according to this retroreflective sheet, the appearance of the pattern can be made different under the non-retroreflective conditions and the retroreflective conditions.

As described above, according to the present invention, provided are the method for manufacturing a retroreflective sheet, and a retroreflective sheet, which can expand selection range of constituent materials of the retroreflective layer and the back face layer.

DESCRIPTION OF EMBODIMENTS

Hereinafter, preferred embodiments of a retroreflective sheet according to the present invention will be described in detail with reference to the drawings.

First Embodiment

Figure 1:
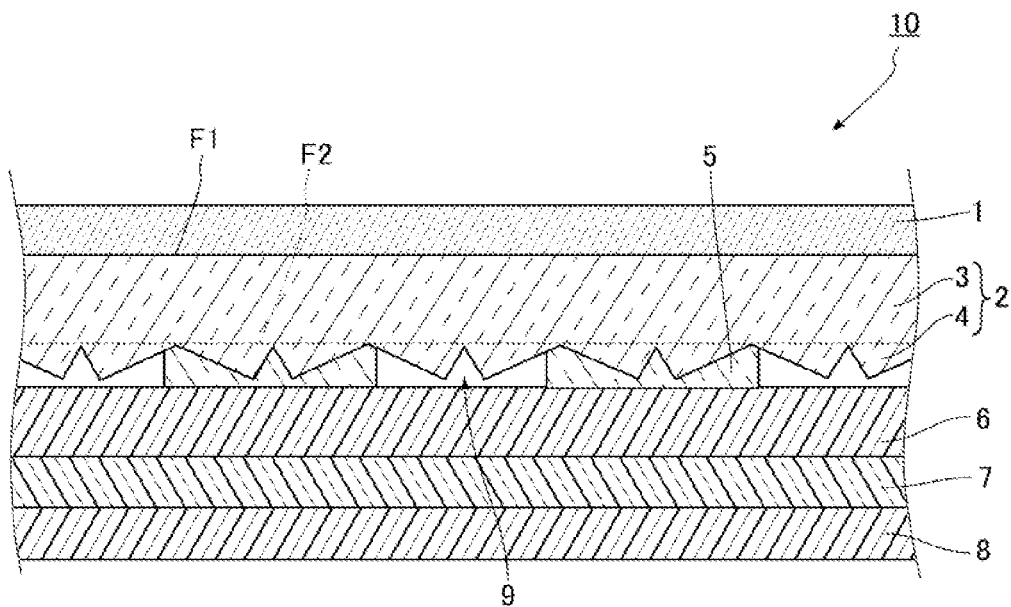
FIG. 1 is a view schematically illustrating a part of a cross section in a thickness direction of a retroreflective sheet according to a first embodiment of the present invention.

FIG. 1 is a view schematically illustrating a part of a cross section in a thickness direction of a retroreflective sheet according to a first embodiment of the present invention. In each of FIG. 1 and other drawings shown below, for ease of understanding, the size of each component may be exaggerated or the like and may not be accurately shown. Further, in each of FIG. 1 and other drawings shown below, only one reference numeral is attached to the same configuration, and repeated reference numerals may be omitted.

As illustrated in FIG. 1, a retroreflective sheet 10 of the present embodiment includes a surface protective layer 1, a retroreflective layer 2, a coupling portion 5, a back face layer 6, an adhesive layer 7, and a release layer 8. Hereinafter, these components included in the retroreflective sheet 10 will be described in more detail.

The surface protective layer 1 is a layer that protects a surface F1 of the retroreflective layer 2 which turns to a viewer side when the retroreflective sheet 10 is used, and is the outermost layer of the retroreflective sheet 10 at the time of being used. From the viewpoint of providing the retroreflective sheet 10 with excellent retroreflectivity, the surface protective layer 1 of the present embodiment is a transparent resin layer, and the total light transmittance of the surface protective layer 1 is preferably 80% or more, for example.

Examples of the material forming the surface protective layer 1 include an acrylic-based resin, an alkyd-based resin, a fluorine-based resin, a vinyl chloride-based resin, a polyester-based resin, an urethane-based resin, and a polycarbonate-based resin, and the like. One kind of these resins may be used alone, or multiple kinds thereof may be mixed and used. From the viewpoint of providing the surface protective layer 1 with weather resistance and processability, an acrylic-based resin, a polyester-based resin, and a vinyl chloride-based resin are preferable. Further, an acrylic-based resin is preferable in consideration of coating suitability and dispersibility of a coloring agent when coloring. In addition, various additives such as an ultraviolet absorber, a light stabilizer, a heat stabilizer, a plasticizer, a cross-linking agent, an antioxidant, a fungicide, and a coloring agent can be appropriately added to the surface protective layer 1 within the range of not significantly impairing transparency.

The retroreflective layer 2 has a plate-shaped holding body 3 and a plurality of retroreflective elements 4. One surface F1 of the holding body 3 is covered with the surface protective layer 1, and the other surface F2 of the holding body 3 is provided with a plurality of retroreflective elements 4. In the retroreflective layer 2 of the present embodiment, the holding body 3 and the plurality of retroreflective elements 4 are integrally formed, and the retroreflective layer 2 is a single resin layer.

The plurality of retroreflective elements 4 is not particularly limited as long as they have reflective surfaces suitable for retroreflecting incident light. For example, when the retroreflective elements 4 having a polygonal shape such as a triangular pyramid or a so-called cube-corner shape are arranged in a close-packed manner, the retroreflectivity is excellent, which is preferable.

From the viewpoint of providing the retroreflective sheet 10 with excellent retroreflectivity, the retroreflective layer 2 is a transparent resin layer. Examples of a material forming the retroreflective layer 2 include an acrylic-based resin, an urethane-based resin, a fluorine-based resin, a polyester-based resin, a vinyl chloride-based resin, a polycarbonate-based resin, a polyarylate-based resin, a silicone-based resin, a polyolefin-based resin, an ionomer resin, and the like. One kind of these resins may be used alone, or multiple kinds thereof may be mixed and used. Further, from the viewpoint of enhancing the transparency and weather resistance of the retroreflective layer 2, the retroreflective layer 2 is preferably made of an acrylic-based resin, an urethane-based resin, a fluorine-based resin, a polycarbonate-based resin, or the like. In addition, various additives such as an ultraviolet absorber, a light stabilizer, a heat stabilizer, a plasticizer, a cross-linking agent, an antioxidant, a fungicide, and a coloring agent can be appropriately added to the retroreflective layer 2 within the range of not significantly impairing transparency.

The coupling portion 5 is a site that couples a part of the plurality of retroreflective elements 4 and a part of the back face layer 6. By interposing the coupling portion 5 between the retroreflective layer 2 and the back face layer 6, a part of the plurality of retroreflective elements 4 and a part of the back face layer 6 are coupled by the coupling portion 5, and a gap 9 is formed between another part of the plurality of the retroreflective elements 4 and another part of the back face layer 6.

The coupling portion 5 is made of a predetermined resin composition. This resin composition is in an adhesive state in which it can be adhered to the retroreflective layer 2 and the back face layer 6 by being applied predetermined energy, and the resin composition is completely cured after a predetermined time elapses from the adhesive state and is in a completely cured state. As described above, "curing is completed" means a state in which the viscosity of a resin composition is increased to such an extent that the retroreflective layer 2 and the back face layer 6 cannot be bonded to each other via the resin composition. In the present embodiment, the resin composition is a resin composition which starts to cure after a lapse of time of, for example, ten seconds or more from applying the predetermined energy by heat or radiation. Examples of radiation that cures such a resin composition include ultraviolet rays, X-rays, and electron beams.

Further, from the viewpoint of firmly coupling the retroreflective layer 2 and the back face layer 6 by the coupling portion 5, the resin composition forming the coupling portion 5 is preferably an adhesive having an adhesive force of 10 N/25 mm or more after curing is completed. Note that the adhesive force is a value obtained when the adhesive portion between the retroreflective layer and the coupling portion 5 breaks, when the coupling portion 5 undergoes cohesive failure, or when the adhesive portion between the back face layer 6 and the coupling portion 5 breaks.

As the resin composition forming the coupling portion 5, for example, a commercially available time-lag ultraviolet curing adhesive can be used. Specifically, as the resin composition forming the coupling portion 5, an acrylic-based resin such as epoxy-modified acrylate, urethane-modified acrylate, and silicone-modified acrylate, an epoxy-based resin, and a silicone-based resin can be used. For example, the FineGlue CV7831 series from Panasonic Corporation starts curing after two minutes or more has passed at room temperature after being irradiated with ultraviolet rays of about 500 mJ/cm$^2$.

Further, when the resin composition forming the coupling portion 5 is a resin composition that is cured by heat, as the resin composition, for example, an acrylic-based resin, an epoxy-based resin, a silicone-based resin, an urethane-based resin, a phenol-based resin, a vinyl acetate-based resin, a nitrile rubber, a chloroprene rubber, a styrene butadiene rubber or the like can be used.

Further, the resin composition forming the coupling portion 5 preferably has thixotropy. Since the resin composition has a thixotropy, the resin composition has flexibility by pressure when it is applied by screen printing. Further, the shape of the resin composition is easily maintained to recover the viscosity of the resin composition after the resin composition has been applied. For example, the resin composition forming the coupling portion 5 is preferably 10,000 mPa·s or more when no pressure is applied, more preferably 40,000 mPa·s or more, further preferably, 100,000 mPa·s or more. Further, by applying the resin composition by screen printing, it is possible to easily apply the resin composition thickly. Therefore, it may be easy to form the gap 9 between the plurality of retroreflective elements 4 and the back face layer 6.

The back face layer 6 is a resin layer provided so as to face the surface of the retroreflective layer 2 on the retroreflective elements 4 side. Examples of a material forming the back face layer 6 include an acrylic-based resin, an urethane-based resin, a fluorine-based resin, a polyester-based resin, a vinyl chloride-based resin, a polycarbonate-based resin, a polyarylate-based resin, a silicone-based resin, a polyolefin-based resin, an ionomer resin, and the like. One kind of these resins may be used alone, or multiple kinds thereof may be mixed and used. Further, from the viewpoint of enhancing the transparency and weather resistance of the back face layer 6, the back face layer 6 is preferably made of an acrylic-based resin, an urethane-based resin, a fluorine-based resin, a polycarbonate-based resin, or the like.

Further, the material forming the back face layer 6 may include a coloring agent. As a coloring agent contained in the material forming the back face layer 6, for example, an inorganic pigment, an organic pigment, an organic dye, a pearl pigment, etc. can be used. For the back face layer 6, one kind of these coloring agents may be used alone, or two or more kinds thereof may be used in combination.

Examples of the above-described inorganic pigments include titanium oxide, calcium carbonate, barium sulfate, zinc oxide, zinc sulfide, carbon black, cadmium red, molybdenum red, ultramarine blue, cobalt blue, rouge, chromium oxide, iron black, cadmium yellow, titanium yellow, nickel titanium yellow, chrome titanium yellow, yellow lead, yellow iron oxide, chrome orange, cadmium orange, gold powder, silver powder, copper powder, aluminum powder, bronze powder, and the like. Further, examples of the organic pigments and organic dyes include organic compounds such as anthraquinone-based compounds, phthalocyanine-based compounds, quinacridone-based compounds, isoindolinone-based compounds, dioxazine-based compounds, quinophthalone-based compounds, quinoimine-based compounds, perylene-based compounds, perinone-based compounds, azo-based compounds, quinoline-based compounds, methine-based compounds, indigo-based compounds, naphtholimide-based compounds, and the like. Further, examples of the pearl pigment include titanium oxide-coated mica, bismuth oxide chloride, fish scale powder, basic lead carbonate, and the like.

Further, various additives such as an ultraviolet absorber, a light stabilizer, a heat stabilizer, a plasticizer, a cross-linking agent, an antioxidant, a fungicide, and the like can be appropriately added to the back face layer 6.

The adhesive layer 7 is a layer provided on the side opposite to the retroreflective layer 2 side of the back face layer 6, and attached to an adherend when the retroreflective sheet 10 is used.

The material forming the adhesive layer 7 can be appropriately selected from, for example, pressure-sensitive adhesives, heat-sensitive adhesives, cross-linking adhesives, and the like. Examples of a pressure-sensitive adhesive include, for example, polyacrylic acid ester pressure-sensitive adhesives obtained by copolymerizing acrylic acid ester such as butyl acrylate, 2-ethylhexyl acrylate, isooctyl acrylate, nonyl acrylate, and the like with acrylic acid, vinyl acetate, etc., silicone-based resin pressure-sensitive adhesives, rubber-based pressure-sensitive adhesives, and the like. Examples of heat-sensitive adhesives include an acrylic-based resin, a polyester-based resin, an epoxy-based resin, and the like. From the viewpoint of providing the adhesive layer 7 with excellent weather resistance and adhesiveness, it is preferable to use an acrylic-based resin or a silicone-based resin.

The release layer 8 is a layer provided on the side of the adhesive layer 7 opposite to the back face layer 6 side. By the release layer 8 covering the adhesive layer 7 before using the retroreflective sheet 10, it is possible to prevent dust and the like from adhering to the adhesive layer 7 and prevent the adhesive layer 7 from adhering to an unintended place. On the other hand, when the retroreflective sheet 10 is used, the release layer 8 is released from the adhesive layer 7.

Such a release layer 8 is not particularly limited, but is formed of, for example, a polyester film, a polypropylene film, paper, or the like.

Next, a method for manufacturing the retroreflective sheet 10 will be described.

Figure 2:
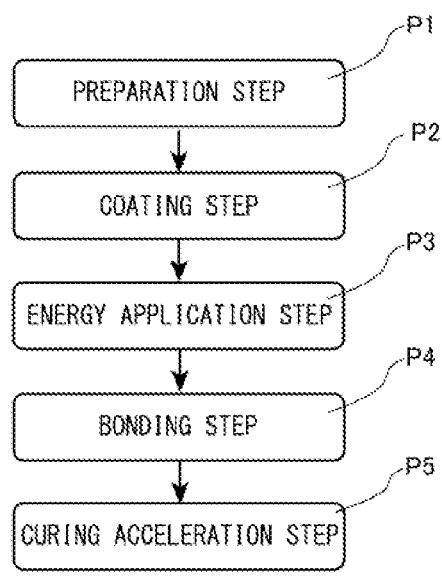
FIG. 2 is a flowchart illustrating steps of a method for manufacturing a retroreflective sheet according to the first embodiment of the present invention.
Figure 3:
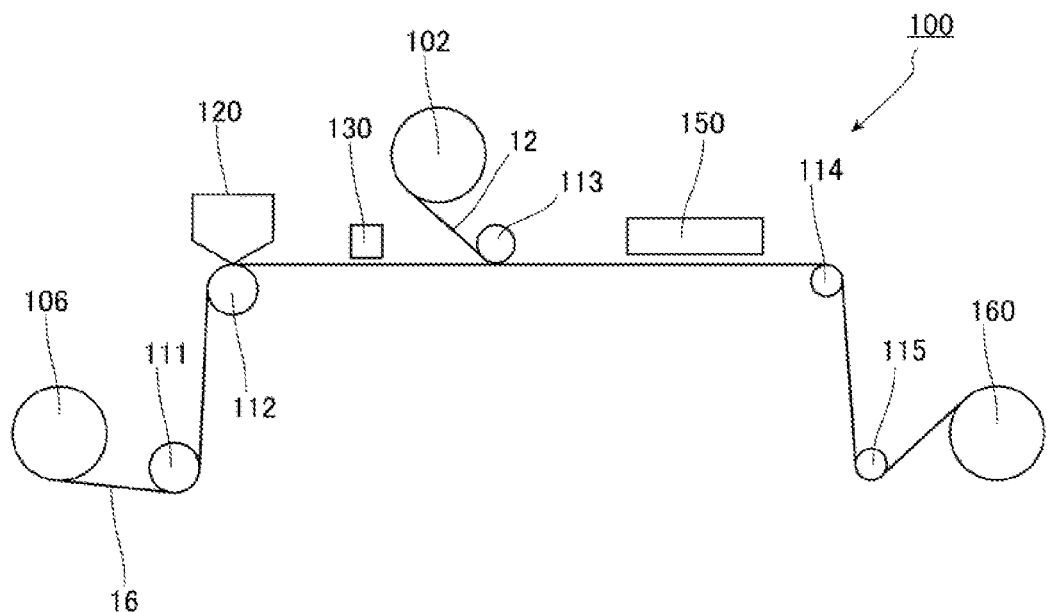
FIG. 3 is a view schematically illustrating a retroreflective sheet manufacturing apparatus according to an embodiment of the present invention.

FIG. 2 is a flowchart illustrating steps of a method for manufacturing a retroreflective sheet according to the embodiment of the present invention. As illustrated in FIG. 2, the method for manufacturing the retroreflective sheet 10 of the present embodiment includes a preparation step P1, a coating step P2, an energy application step P3, a bonding step P4, and a curing acceleration step P5. Further, FIG. is a view schematically illustrating a manufacturing apparatus 100 for the retroreflective sheet 10 according to the present embodiment.

(Preparation Step P1)

This step is for preparing a resin composition that has a viscosity that allows adhesion over a predetermined time after application of predetermined energy and completes curing after the elapse of the predetermined time. In the present embodiment, as such a resin composition, a resin composition 15 which starts to cure after a lapse of approximately two minutes or more after irradiation with ultraviolet rays of about 500 mJ/cm² is prepared and filled in a printing device 120 described later. Further, in this step, a sheet 12 having the retroreflective layer 2 and a sheet 16 having the back face layer 6 are prepared. Specifically, a sheet roll 102 formed by winding the sheet 12 having the retroreflective layer 2 and a sheet roll 106 formed by winding the sheet 16 having the back face layer 6 are prepared.

(Coating Step P2)

This is a step of coating the back face layer 6 with a resin composition forming the coupling portion 5. The sheet 16 unwound from the sheet roll 106 is hung on rollers 111 and 112 while being tensioned, and is conveyed to the bottom of the printing device 120 at a predetermined conveying speed. The sheet 16 carried to the bottom of the printing device 120 is coated with the resin composition forming the coupling portion 5 by the printing device 120. That is, the back face layer 6 is coated with the resin composition forming the coupling portion 5.

In this step, the method of applying the resin composition forming the coupling portion 5 to the back face layer 6 is not particularly limited. For example, the printing device 120 coats the back face layer 6 with the resin composition by any printing method such as screen printing, gravure printing, flexo printing, inkjet printing, and the like. As described above, screen printing is particularly preferable among these printing methods, and it may be easy to apply a thick resin composition. Therefore, it may be easy to form the gap 9 between the plurality of retroreflective elements 4 and the back face layer 6. Examples of the screen printing method include a method using a plate and a squeegee, and a method using a rotary screen device.

Figure 4:
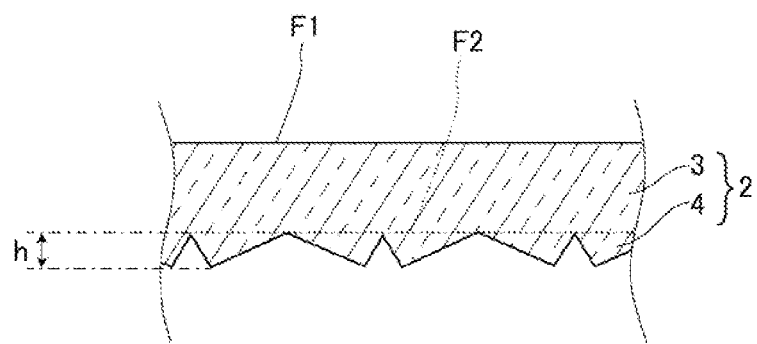
FIG. 4 is a cross-sectional view illustrating a state after a coating step of a resin composition forming a coupling portion illustrated in FIG. 1.
Figure 4:
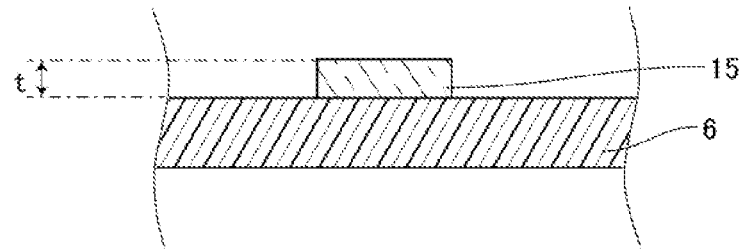

FIG. 4 is a cross-sectional view illustrating a state after the coating step P2 of the resin composition 15 forming the coupling portion 5. Note that although the retroreflective layer 2 is not disposed on the resin composition 15 before the energy application step P3, in FIG. 4, the retroreflective layer 2 is illustrated for reference in order to facilitate the description of the coating thickness t of the resin composition 15 or the like.

In the coating step P2, the resin composition 15 is applied on the back face layer 6. The thickness t of the resin composition 15 at this time is preferably ⅔ or more and 4/3 or less of the height h of the retroreflective elements 4 adhered to the resin composition 15. Further, it is preferable that the thickness t be constant. By applying the resin composition 15 in this way, grooves between the retroreflective elements 4 adjacent to each other when the resin composition 15 is sandwiched and pressed between the retroreflective layer 2 and the back face layer 6 can be filled with the resin composition 15 in the subsequent step. Therefore, the resin composition 15 can firmly adhere the back face layer 6 and the retroreflective layer 2 together.

In addition, the area of the region where the resin composition 15 is applied is preferably 30% to 70%, and more preferably about 50% to 60% of the area of the back face layer 6 in plan view of the back face layer 6. By applying the resin composition 15 in this manner, while sufficiently coupling the retroreflective layer 2 and the back face layer with the resin composition 15, the gap 9 can be sufficiently formed.

(Energy Application Step P3)

This is a step of applying predetermined energy to the resin composition 15 forming the coupling portion 5. The energy application step P3 of the present embodiment will be described for the case where the resin composition 15 is a time difference ultraviolet curing adhesive.

After the coating step P2, the sheet 16 coated with the resin composition 15 is conveyed below an ultraviolet irradiation device 130. When the resin composition 15 is irradiated with ultraviolet rays from the ultraviolet irradiation device 130, predetermined energy is applied to the resin composition 15 by ultraviolet rays, and the resin composition 15 starts to cure after a predetermined time has elapsed. Specifically, the resin composition 15 is irradiated with ultraviolet rays of about 500 mJ/cm². Therefore, as described above, the resin composition 15 starts to cure after approximately two minutes or more have passed from the irradiation of the ultraviolet rays.

The sheet 16 in a state where the resin composition 15 is applied, and predetermined energy is applied to the resin composition 15 is conveyed from the ultraviolet irradiation device 130 to below a pressing roll 113 at the above-described predetermined conveying speed. In the present embodiment, the time required for the sheet 16 to be conveyed from the ultraviolet irradiation device 130 to the pressing roll 113 is approximately ten seconds to two minutes. As described above, the resin composition 15 in the present embodiment starts to cure after two minutes or more have passed from the irradiation of ultraviolet rays. Therefore, when the resin composition 15 reaches the pressing roll 113, the resin composition 15 is substantially in a state before being cured.

(Bonding Step P4)

This is a step in which the retroreflective layer 2 and the back face layer 6 are bonded together via the resin composition 15 after the energy application step P3. The sheet 12 unwound from the sheet roll 102 is stacked with the sheet 16 via the resin composition 15 by using the pressing roll 113. As described above, when the resin composition 15 reaches the pressing roll 113, the resin composition 15 is substantially in a state before the curing is started and has a viscosity capable of adhering. Therefore, in this step, by pressing the sheet 12 to the sheet 16 side by the pressing roll 113 after the sheet 12 is stacked on the sheet 16 via the resin composition 15, the retroreflective layer 2 and the back face layer 6 are bonded together via the resin composition 15. At this time, the pressure applied to the retroreflective layer 2 is a pressure that suppresses the deformation of the retroreflective elements 4. The resin composition 15 sandwiched between the retroreflective elements 4 and the back face layer 6 is pushed by the retroreflective elements 4 and the back face layer 6 and flows as the distance between the retroreflective elements 4 and the back face layer 6 approaches. In cast that the pressure applied to the retroreflective layer 2 is a pressure that suppresses the deformation of the retroreflective elements 4, when the resin composition 15 is pressed until the retroreflective elements 4 and the back face layer 6 come into contact with each other, the pressure is no longer applied to the resin composition 15, and the resin composition 15 stops flowing.

By sandwiching the resin composition 15 between the retroreflective elements 4 and the back face layer 6 as described above, a part of the retroreflective elements 4 and a part of the back face layer 6 are adhered by the resin composition 15, and the gap 9 is formed between another part of the retroreflective elements 4 and another part of the back face layer 6.

Incidentally, in the present embodiment, an example is described, in which this step is performed before the curing of the resin composition is performed by using the resin composition 15 which is in a state before the curing starts when reaching the pressing roll 113. However, another resin composition may be used as long as it has a viscosity capable of adhering over a predetermined time after application of predetermined energy and has a characteristic that the curing is completed after the elapse of the predetermined time. That is, even in the case of a resin composition in which curing is started from the application of predetermined energy until the pressing roll 113 is reached, if the resin composition has a viscosity capable of adhering over a predetermined time until reaching the pressing roll 113 after application of predetermined energy, the resin composition in which curing starts before reaching the pressing roll 113 may be used. Note that, in the case of using a resin composition in which curing starts before reaching the pressing roll 113, it is preferable to perform this step before the viscosity of the resin composition increases by 30% or more based on the viscosity of the resin composition when predetermined energy is applied. In this manner, the retroreflective layer 2 and the back face layer 6 can be effectively bonded to each other.

However, it is more preferable that this step be performed before the curing of the resin composition 15 is started. By laminating the retroreflective layer 2 and the back face layer 6 via the resin composition 15 before the curing of the resin composition 15 starts, the resin composition 15 may more easily adhere to the retroreflective layer 2 and the back face layer 6.

Thus, in this step, the retroreflective layer 2 and the back face layer 6 are laminated and bonded to each other via the energy-applied resin composition before a predetermined time elapses.

Note that, in this step, the predetermined time period in which the adhesive state is maintained after the predetermined energy is applied need not be approximately two minutes described above. For example, it may be within one minute, or may be longer than two minutes. When the predetermined time is longer than two minutes, it is possible to secure a sufficient time from applying energy to the resin composition 15 to bonding the retroreflective layer 2 and the back face layer 6 together. Further, when the predetermined time is within one minute, the time is preferably ten seconds or more, more preferably thirty seconds or more, for example. In the retroreflective sheet manufacturing method as described above, it generally takes about ten seconds or more from applying the predetermined energy to the resin composition 15 until bonding the retroreflective layer 2 and the back face layer 6 together. Therefore, by setting the predetermined time to ten seconds or more, the retroreflective layer 2 and the back face layer 6 can be effectively bonded to each other.

(Curing Acceleration Step P5)

This is a step of accelerating the curing rate of the resin composition 15 after the bonding step P4. In the curing acceleration step P5 of the present embodiment, the sheets 12 and 16 stacked via the resin composition 15 are heated when passing under a heating device 150. Note that the heating device 150 is not limited to the one that heat the resin composition 15 from above, but may be the one that heats the resin composition 15 from below, or may be the one that heats the resin composition 15 from above and below. The resin composition 15 is heated by the heating device 150 to accelerate the curing. The heating temperature of the resin composition 15 by the heating device 150 is preferably a sufficiently low temperature at which the deformation of the retroreflective layer 2 and the back face layer 6 can be suppressed, and is set to, for example, about 60° C. to 80° C. The higher the heating temperature of the resin composition 15 by the heating device 150 is, the more easily the curing of the resin composition 15 is accelerated. Further, the heating time of the resin composition 15 by the heating device 150 is, for example, about three to ten minutes.

Note that examples of a method for adjusting the curing rate of the resin composition 15 includes a method for adjusting the energy amount of the ultraviolet rays with which the resin composition 15 is irradiated in the energy application step P3, other than adjusting the heating temperature and the heating time in the curing acceleration step P5. The higher the energy of the ultraviolet rays with which the resin composition 15 is irradiated, the higher the curing rate of the resin composition 15 tends to be.

The sheets 12 and 16 heated by the heating device 150 is wound up by a winding roll 160 while being tensioned by being hung on the rollers 114 and 115. The resin composition 15 is completely cured before the sheets 12 and 16 are wound up by the winding roll 160 to become the coupling portion 5, and the deformation of the coupling portion 5 is suppressed. Therefore, the relative displacement between the retroreflective layer 2 and the back face layer 6 is suppressed. The retroreflective sheet 10 is obtained by cutting the sheets 12 and 16 wound in this way into appropriate sizes.

Note that, in the description of the method for manufacturing the retroreflective sheet 10, the method for laminating the surface protective layer 1, the pressure-sensitive adhesive layer 7, and the release layer 8 is not described, but the method for laminating these layers is not particularly limited. For example, the surface protective layer 1 may be laminated on the retroreflective layer 2 in the preparation step P1 or may be laminated on the retroreflective layer 2 after the bonding step P4. Further, the pressure-sensitive adhesive layer 7 and the release layer 8 may be laminated on the back face layer 6 in the preparation step P1 or may be laminated on the back face layer 6 after the bonding step P4.

The method for manufacturing the retroreflective sheet 10 described above includes the coating step P2, the energy application step P3, and the bonding step P4, the resin composition 15 has a viscosity capable of adhering over a predetermined time after application of predetermined energy, and the curing is completed after the lapse of the predetermined time. Therefore, the curing of the resin composition 15 can be completed after the retroreflective layer 2 and the back face layer 6 are bonded together via the resin composition 15 by applying predetermined energy to the resin composition 15 before the retroreflective layer 2 and the back face layer 6 are bonded together via the resin composition 15. Therefore, the retroreflective layer 2 and the back face layer 6 do not need to transmit radiation such as ultraviolet rays, which is an energy source, for curing the resin composition 15 forming the coupling portion 5. Therefore, at least one of the retroreflective layer 2 and the back face layer 6 may be made of a material that does not transmit 50% or more of radiation such as ultraviolet rays, or a material that does not transmit radiation such as ultraviolet rays.

In addition, in the method for manufacturing the retroreflective sheet 10 of the present embodiment, the example in which the resin composition 15 is the time difference ultraviolet curing adhesive has been described. However, the resin composition 15 is in an adhesive state capable of adhering to the retroreflective layer 2 and the back face layer 6 by applying predetermined energy, any resin composition may be used as long as the resin composition is in a completely cured state after a predetermined time has passed from the adhesive state, and a thermosetting adhesive may be used. In this case, the energy application step P3 is a step of applying heat to the resin composition 15. When the curing is completed after the resin composition 15 forming the coupling portion 5 is heated as predetermined energy, the resin composition 15 can be cured after the retroreflective layer 2 and the back face layer 6 are bonded to each other via the resin composition 15 by is applying heat to the resin composition 15 before the retroreflective layer 2 and the back face layer 6 are bonded together via the resin composition 15. Therefore, heat for curing the resin composition 15 forming the coupling portion 5 can be added to the resin composition 15 without passing through the retroreflective layer 2 and the back face layer 6. Therefore, at least one of the retroreflective layer 2 and the back face layer 6 may be made of, for example, a flexible material that can be deformed by the heat applied in the energy application step.

As described above, the method for manufacturing the retroreflective sheet 10 of the present embodiment can expand the range of selection of the constituent materials of the retroreflective layer 2 and the back face layer 6.

Further, as described above, in the method for manufacturing the retroreflective sheet 10 of the present embodiment, the resin composition 15 is an ultraviolet curable resin, and the resin composition 15 is irradiated with ultraviolet rays in the energy application step P3. Since the resin composition 15 is an ultraviolet curable resin, the resin composition 15 can be cured without applying heat, such that deformation of the retroreflective layer 2 and the back face layer 6 due to heat can be suppressed.

In addition, the method for manufacturing the retroreflective sheet 10 of the present embodiment includes the curing acceleration step P5 that accelerates the curing rate of the resin composition 15 after the bonding step P4. By accelerating the curing of the resin composition 15, the time required for manufacturing of the retroreflective sheet 10 can be shortened.

Incidentally, in the method for manufacturing the retroreflective sheet 10 of the present embodiment, although heat is applied to the retroreflective layer 2 and the back face layer 6 in the curing acceleration step P5, as described above, the heating temperature of the retroreflective layer 2 and the back face layer 6 in the curing acceleration step P5 is set to a sufficiently low temperature.

Second Embodiment

Next, a second embodiment of the present invention will be described. Note that, regarding the same or equivalent constituent elements as in the first embodiment, unless otherwise specified, the same reference numerals will be given, and redundant description will be omitted.

Figure 5:
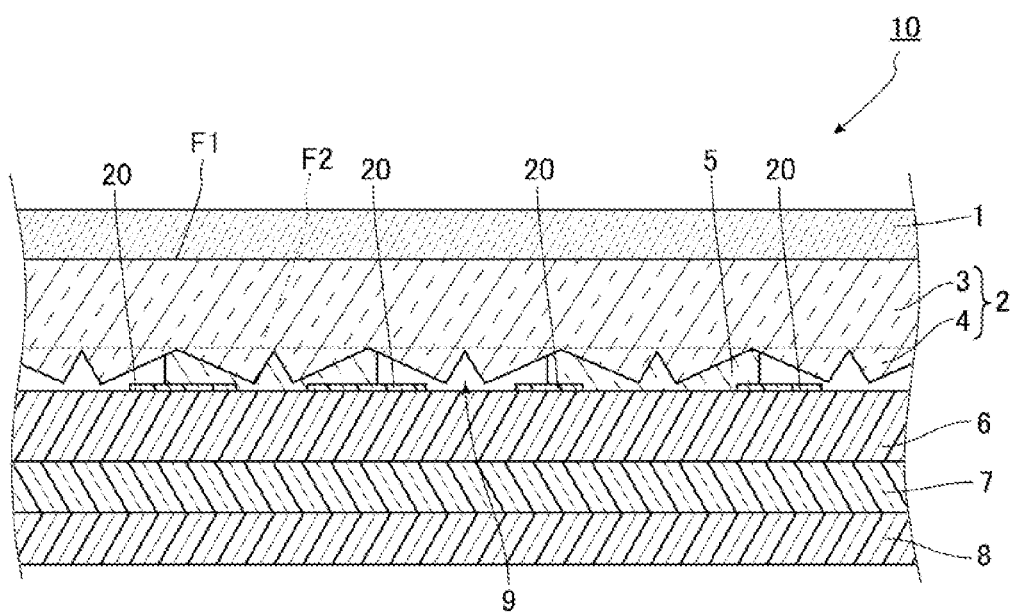
FIG. 5 is a view illustrating a retroreflective sheet according to a second embodiment of the present invention from the same viewpoint as in FIG. 1.

FIG. 5 is a view illustrating a retroreflective sheet according to a second embodiment of the present invention from the same viewpoint as in FIG. 1. As illustrated in FIG. 5, a retroreflective sheet 10 of the present embodiment is different from the retroreflective sheet 10 of the first embodiment that does not include such a printed layer, in that it further includes a printed layer 20 formed on the surface of a back face layer 6 facing a retroreflective layer 2.

The printed layer 20 is usually formed by means such as gravure printing, screen printing, flexo printing, and inkjet printing, and has a predetermined pattern or color. As illustrated in FIG. 5, the printed layer 20 is formed between the retroreflective layer 2 and the back face layer 6, and at least a part of the printed layer 20 is formed between a coupling portion 5 and the back face layer 6.

As described above, the retroreflective sheet 10 of the present embodiment further includes the printed layer 20 formed between the retroreflective layer 2 and the back face layer 6. In this way, when the printed layer 20 on the surface of the back face layer 6 that faces the retroreflective layer 2 is formed, under non-retroreflective conditions where light does not retroreflect, light reaches the printed layer 20 and is reflected by the printed layer 20, and therefore the printed layer 20 can be clearly projected. On the other hand, under the retroreflective conditions where light retroreflects, the light is retroreflected by the retroreflective layer 2 before reaching the printed layer 20, and therefore the printed layer 20 becomes difficult to be displayed. Therefore, according to the retroreflective sheet 10 according to the present embodiment, the appearance of the pattern can be made different under the non-retroreflective conditions and the retroreflective conditions.

Incidentally, when the coupling portion 5 and the back face layer 6 are integrally formed, the shape of the boundary between the coupling portion 5 and the back face layer 6 tends to be curved. Therefore, in this case, when a printed layer is formed on the back face layer 6, there is a concern that the printed layer formed at the boundary and in the vicinity of the boundary may be distorted. However, in the retroreflective sheet 10 of the present embodiment, the coupling portion 5 and the back face layer 6 are formed as separate bodies, and the printed layer 20 is formed on the surface of the back face layer 6, and therefore unlike the case where the coupling portion 5 and the back face layer 6 are integrally formed, the printed layer 20 is formed substantially flat. Therefore, according to the retroreflective sheet 10 of the present embodiment, the distortion of the printed layer can be effectively suppressed.

Such a retroreflective sheet 10 of the present embodiment can be manufactured by performing the printed layer forming step of forming the printed layer 20 on the surface of the back face layer 6 that faces the retroreflective layer 2, for example, after the preparation step P1 and before the coating step P2.

When the printed layer 20 is formed on the back face layer 6, light and heat is blocked by the printed layer 20 and not sufficiently transmitted to a resin composition 15, in some cases. In this case, the adhesion between the retroreflective layer 2 and the back face layer 6 may be insufficient. However, in the method for manufacturing the retroreflective sheet according to the present embodiment, as described above, energy such as light and heat can be applied to the resin composition 15 before the retroreflective layer 2 and the back face layer 6 are superimposed on each other, such that a large amount of energy can be applied to the resin composition 15, as compared with the case where energy is applied after the retroreflective layer 2 and the back face layer 6 are superimposed on each other. Therefore, even if some of the light or heat is blocked by the printed layer 20, sufficient light and heat can be applied to the resin composition 15. Therefore, it is possible to effectively bond the retroreflective layer 2 and the back face layer 6 via the resin composition 15 while forming the printed layer 20 on the back face layer 6.

In addition, in the present embodiment, the printed layer 20 may be provided with infrared absorbance or infrared reflectivity. Further, the printed layer 20 may be a hologram or a watermark pattern.

Although the present invention has been described with reference to the preferred embodiment, the present invention is not limited to this.

For example, in the above-described embodiments, the example including the surface protective layer 1 has been described, but the surface protective layer 1 is not an essential component. The adhesive layer 7 is also not an essential component. For example, when the back face layer 6 is made of an adhesive, the retroreflective sheet 10 can be attached to an object even if the adhesive layer 7 is not provided. Therefore, the layer configuration of the retroreflective sheet 10 can be simplified, and an increase in the production cost of the retroreflective sheet 10 can be suppressed.

Further, the retroreflective sheet of the present invention may be provided with layers other than the layers exemplified in the above-described embodiments. For example, a colored layer or a printed layer may be provided between the surface protective layer 1 and the retroreflective layer 2.

Further, in the above-described embodiments, an example in which the resin composition 15 is applied by screen printing has been described, but the method of applying the resin composition 15 is not particularly limited. However, by applying the resin composition 15 by screen printing, the resin composition 15 can be easily applied thickly.

Further, in the above embodiment, an example in which the resin composition 15 is applied to the back face layer 6 in the coating step P2 has been described, but the resin composition 15 may be applied to the retroreflective layer 2.

Further, in the above-described embodiments, the example including the curing acceleration step P5 has been described, but the curing acceleration step P5 is not an essential step.

In addition, in the above-described embodiments, the coupling portion 5 may be colored, and the colored coupling portion 5 may form a pattern on the retroreflective sheet. In this case, for example, a retroreflective sheet that is visually recognized as different colors and patterns in daytime and nighttime can be configured.

In addition, in the first embodiment, all of the surface protective layer 1, the retroreflective layer 2, the coupling portion 5, the back face layer 6, and the adhesive layer 7 may be formed transparent. In this case, for example, the retroreflective sheet with different visibility between under the retroreflective conditions and under the non-retroreflective conditions when attached to a window, etc. can be configured and function as a blindfold for the room.

Further, in the second embodiment, the printed layer 20 may be formed such that the joining strength between the coupling portion 5 and the printed layer 20 is larger than the joining strength between the back face layer 6 and the printed layer 20. In this case, since the joining strength between the coupling portion 5 and the printed layer 20 is larger than the joining strength between the back face layer 6 and the printed layer 20, when the coupling portion 5 is peeled from the back face layer 6, peeling or cohesive failure may occur between the back face layer 6 and the printed layer 20. Therefore, it is possible to prevent the printed layer 20 from being duplicated or changed, and enhance a tampering prevention function.

As described above, according to the present invention, a retroreflective sheet manufacturing method and a retroreflective sheet, capable of expanding selection range of the constituent materials of the retroreflective layer and the back face layer can be used in fields such as guide signs and advertising signs.

REFERENCE SIGNS LIST

1 . . . surface protective layer
2 . . . retroreflective layer
3 . . . holding body
4 . . . retroreflective elements
5 . . . coupling portion
6 . . . back face layer
7 . . . adhesive layer
8 . . . release layer
9 . . . gap
10 . . . retroreflective sheet
20 . . . printed layer
P1 . . . preparation step
P2 . . . coating step
P3 . . . energy application step
P4 . . . bonding step
P5 . . . curing acceleration step

The invention claimed is:

1. A method for manufacturing a retroreflective sheet, provided with a retroreflective layer having a plurality of retroreflective elements on one surface, a back face layer provided to face a plurality of the retroreflective elements, and a coupling portion configured (i) to couple a part of a plurality of the retroreflective elements and a part of a one side surface of the back face layer and (ii) not to couple the other part of a plurality of the retroreflective elements and the other part of the one side surface of the back face layer, the method comprising:
   a preparation step of preparing a resin composition that has a viscosity capable of adhering over a predetermined time after application of predetermined energy, and completes curing after the predetermined time passes;
   a coating step of applying the resin composition forming the coupling portion on the retroreflective layer or the back face layer;
   an energy application step of applying the predetermined energy to the resin composition; and
   a bonding step of bonding the retroreflective layer and the back face layer via the resin composition to which the predetermined energy is applied before the predetermined time passes.

2. The method for manufacturing a retroreflective sheet according to claim 1, wherein the bonding step is performed before the curing of the resin composition starts.

3. The method for manufacturing a retroreflective sheet according to claim 1, wherein the bonding step is performed before the viscosity of the resin composition is increased by 30% or more based on the viscosity of the resin composition when the predetermined energy is applied.

4. The method for manufacturing a retroreflective sheet according to claim 1, wherein the resin composition is an ultraviolet curable resin, and the resin composition is irradiated with ultraviolet rays in the energy application step.

5. The method for manufacturing a retroreflective sheet according to claim 1, further comprising a curing acceleration step of increasing a curing rate of the resin composition after the bonding step.

6. The method for manufacturing a retroreflective sheet according to claim 1, wherein the resin composition has thixotropy, and
   in the coating step, the resin composition is applied by screen printing.

7. The method for manufacturing a retroreflective sheet according to claim 1, wherein, in the coating step, the resin composition is applied on the back face layer, and
   the thickness of the resin composition is ⅔ or more of the height of the retroreflective elements adhered to the resin composition.

8. The method for manufacturing a retroreflective sheet according to claim 1, wherein the predetermined time is ten seconds or more after the predetermined energy is applied to the resin composition.

9. The method for manufacturing a retroreflective sheet according to claim 8, wherein the predetermined time is two minutes or more after the predetermined energy is applied to the resin composition.

10. The method for manufacturing a retroreflective sheet according to claim 1, further comprising a printed layer forming step of forming a printed layer on a surface of the back face layer facing the retroreflective layer before the coating step.

11. A retroreflective sheet, comprising:
a retroreflective layer having a plurality of retroreflective elements on one surface;
a back face layer provided to face the plurality of retroreflective elements; and
a coupling portion configured (i) to couple a part of a plurality of the retroreflective elements and a part of a one side surface of the back face layer and (ii) not to couple the other part of a plurality of the retroreflective elements and the other part of the one side surface of the back face layer, wherein
a gap is provided between another part of a plurality of the retroreflective elements and another part of the back face layer, and
the coupling portion is made of a resin composition that is in an adhesive state capable of being adhered to the retroreflective layer and the back face layer by applying predetermined energy and in a completely cured state where curing is completed after a predetermined time has passed from the adhesive state.

12. The retroreflective sheet according to claim 11, further comprising a printed layer formed on a surface of the back face layer that faces the retroreflective layer.

13. The method for manufacturing a retroreflective sheet according to claim 1, wherein the back face layer and the coupling portion are separate members.

14. The method for manufacturing a retroreflective sheet according to claim 13, wherein a printed layer is formed so that a part of the printed layer is located between the back face layer and the coupling portion and in contact with the coupling portion, and the other part is not in contact with the coupling portion.

15. A retroreflective sheet according to claim 11, wherein the back face layer and the coupling portion are separate members.

16. A retroreflective sheet according to claim 15, wherein a printed layer is formed so that a part of the printed layer is located between the back face layer and the coupling portion and in contact with the coupling portion, and the other part is not in contact with the coupling portion.

\* \* \* \* \*